(12) United States Patent
Isobe et al.

(10) Patent No.: US 11,161,209 B2
(45) Date of Patent: Nov. 2, 2021

(54) MACHINE TOOL

(71) Applicant: FANUC CORPORATION, Yamanashi (JP)

(72) Inventors: Gaku Isobe, Yamanashi (JP); Yoshihiro Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 16/794,485

(22) Filed: Feb. 19, 2020

(65) Prior Publication Data

US 2020/0316737 A1 Oct. 8, 2020

(30) Foreign Application Priority Data

Apr. 4, 2019 (JP) .............................. JP2019-071987

(51) Int. Cl.
*B23Q 3/157* (2006.01)
*G05B 19/4067* (2006.01)
(Continued)

(52) U.S. Cl.
CPC .......... *B23Q 3/15534* (2016.11); *B23Q 3/157* (2013.01); *B23Q 3/15513* (2013.01);
(Continued)

(58) Field of Classification Search
CPC .......... G05B 19/4067; G05B 19/40938; G05B 2219/50104; G05B 2219/50275;
(Continued)

(56) References Cited

U.S. PATENT DOCUMENTS 4,484,287 A * 11/1984 Gamo ................. G05B 19/406
219/69.16
4,604,560 A * 8/1986 Inagaki ............... G05B 19/232
318/563
(Continued)

FOREIGN PATENT DOCUMENTS

EP          1026562 A2    8/2000
JP       S61-270048 A   11/1986
(Continued)

OTHER PUBLICATIONS

Japanese Search Report dated May 31, 2021, in connection with corresponding JP Application No. 2019-071987 (23pp., including machine-generated English translation).

*Primary Examiner* — Boyer D Ashley
*Assistant Examiner* — Michael Vitale
(74) *Attorney, Agent, or Firm* — Maier & Maier, PLLC

(57) ABSTRACT

A machine tool includes a motor configured to rotate a spindle, a tool magazine holding a plurality of tools, and a controller. The controller has a storage unit storing motor information indicating that the motor is a synchronous motor. When the machine tool stops, while a tool exchange process is carried out, due to electric power outage, operation of a stop button, a value of a drive current of the motor, or a value output from the sensor, the controller uses a command for the synchronous motor, based on the motor information, as a part of a series of commands for recovery of the machine tool, where the tool exchange process is a process in which a tool attached to the spindle is changed with one of the plurality of tools of the tool magazine.

4 Claims, 10 Drawing Sheets

(51) Int. Cl.
*B23Q 3/155* (2006.01)
*B23Q 3/16* (2006.01)

(52) U.S. Cl.
CPC .......... *B23Q 3/15526* (2013.01); *B23Q 3/16* (2013.01); *G05B 19/4067* (2013.01); *G05B 2219/50104* (2013.01)

(58) Field of Classification Search
CPC ............ B23Q 3/15503; B23Q 3/15534; B23Q 3/15706; B23Q 3/15722; Y10T 483/12–15; Y10T 483/179; Y10T 483/1793; Y10T 483/1795; Y10T 483/1705
USPC ...... 483/4–13, 54, 55, 56, 18; 700/160, 170, 700/179
See application file for complete search history.

(56) References Cited

U.S. PATENT DOCUMENTS

| | | | |
|---|---|---|---|
| 4,723,219 A * | 2/1988 | Beyer | G05B 19/4067 318/572 |
| 4,833,772 A * | 5/1989 | Kobayashi | B23Q 3/15526 483/44 |
| 5,134,767 A * | 8/1992 | Yasuda | B23Q 3/15706 483/7 |
| 5,637,069 A | 6/1997 | Klicpera et al. | |
| 5,777,450 A * | 7/1998 | Kono | G05B 19/406 318/568.11 |
| 6,252,367 B1 | 6/2001 | Sakamoto et al. | |
| 6,901,298 B1 * | 5/2005 | Govindaraj | G05B 19/058 700/21 |
| 2017/0087679 A1 * | 3/2017 | Yamamoto | B23Q 3/15722 |

FOREIGN PATENT DOCUMENTS

| | | |
|---|---|---|
| JP | H06-170671 A | 6/1994 |
| JP | H07-505835 A | 6/1995 |
| JP | H11-282518 A | 10/1999 |
| JP | 2000-198039 A | 7/2000 |
| JP | 3229875 B2 | 11/2001 |
| JP | 2014-049029 A | 3/2014 |
| KR | 10-2013-0069932 A | 6/2013 |
| WO | 93/22100 A1 | 11/1993 |

* cited by examiner

MACHINE TOOL

CROSS-REFERENCE TO RELATED APPLICATIONS

This application is based on and claims priority to Japanese Patent Application No. 2019-071987 filed on Apr. 4, 2019, the content of which is incorporated herein by reference in its entirety.

FIELD

The present invention relates to a machine tool.

BACKGROUND

Conventionally, there is known a machine tool provided with a tool magazine that holds a plurality of tools, wherein selected one of the plurality of tools of the tool magazine is attached to a spindle. For example, the apparatuses disclosed in Japanese Unexamined Patent Application Publication No. H11-282518 and Japanese Unexamined Patent Application Publication No. H06-170671 are known.

SUMMARY

A machine tool according to a first aspect of the present disclosure includes a spindle, a motor configured to rotate the spindle, a tool magazine holding a plurality of tools, and a controller, wherein the controller has a storage unit storing motor information indicating that the motor is a synchronous motor, and when the machine tool stops while a tool exchange process is being carried out, the controller is configured to use a command for the synchronous motor as a part of a series of commands for recovery of the machine tool, the controller being configured to decide to use the command based on the motor information, the tool exchange process being a process in which a tool attached to the spindle is replaced with one of the plurality of tools of the tool magazine.

A machine tool according to a second aspect of the present disclosure includes a spindle, a motor configured to rotate the spindle, a tool magazine holding a plurality of tools, and a controller, wherein the controller has a storage unit storing motor information indicating that the motor is a synchronous motor, and when the machine tool stops while a tool exchange process is being carried out, the controller is configured to use a command for the synchronous motor as a part of a series of commands for recovery of the machine tool, the controller being configured to decide to use the command based on the motor information and on a situation in which a rotating position of a rotor of the motor is unrecognized, the tool exchange process being a process in which a tool attached to the spindle is replaced with one of the plurality of tools of the tool magazine.

DETAILED DESCRIPTION

Figure 1:
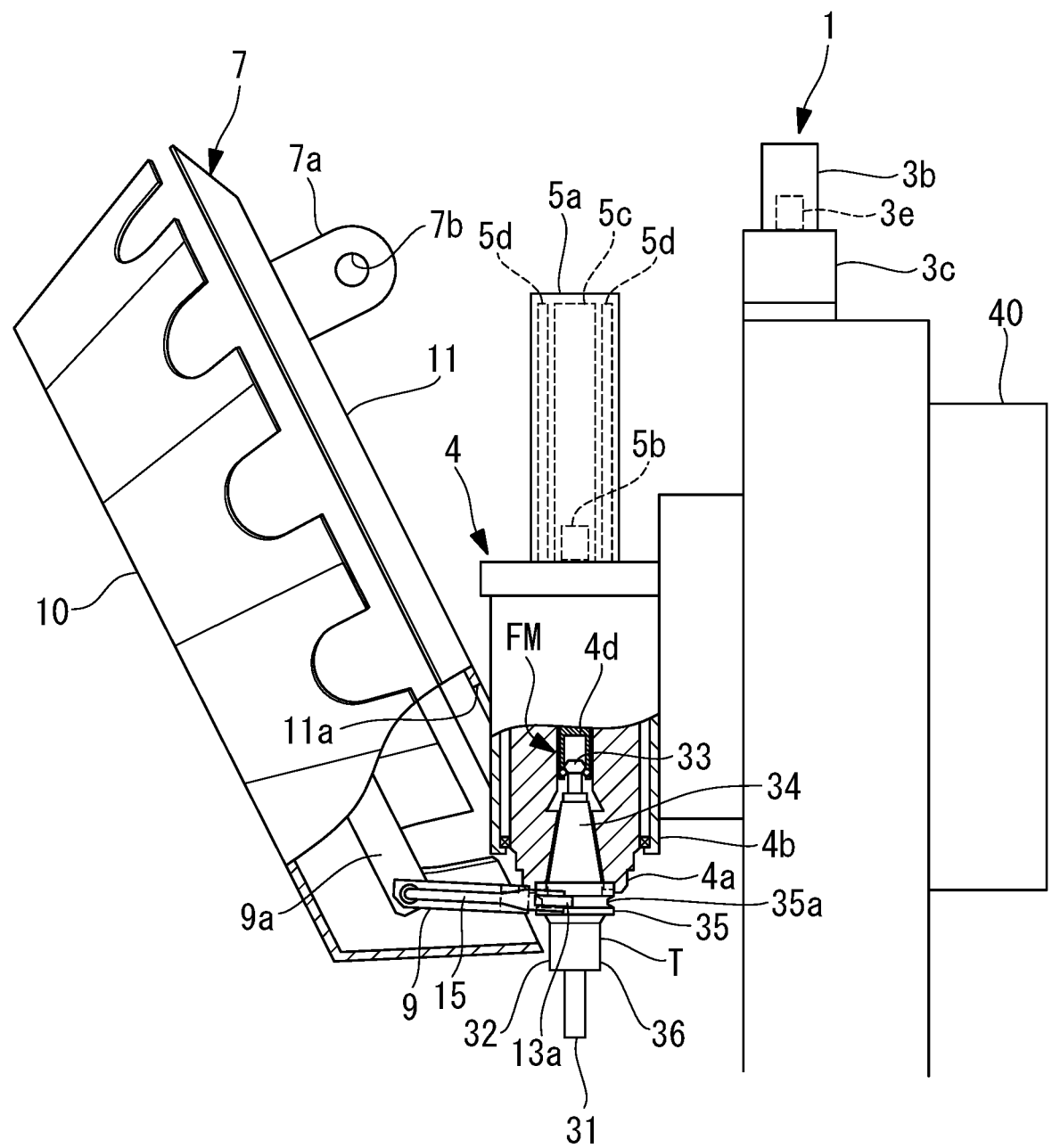
FIG. 1 is a schematic side view of a machine tool according to an embodiment of the present invention.
Figure 2:
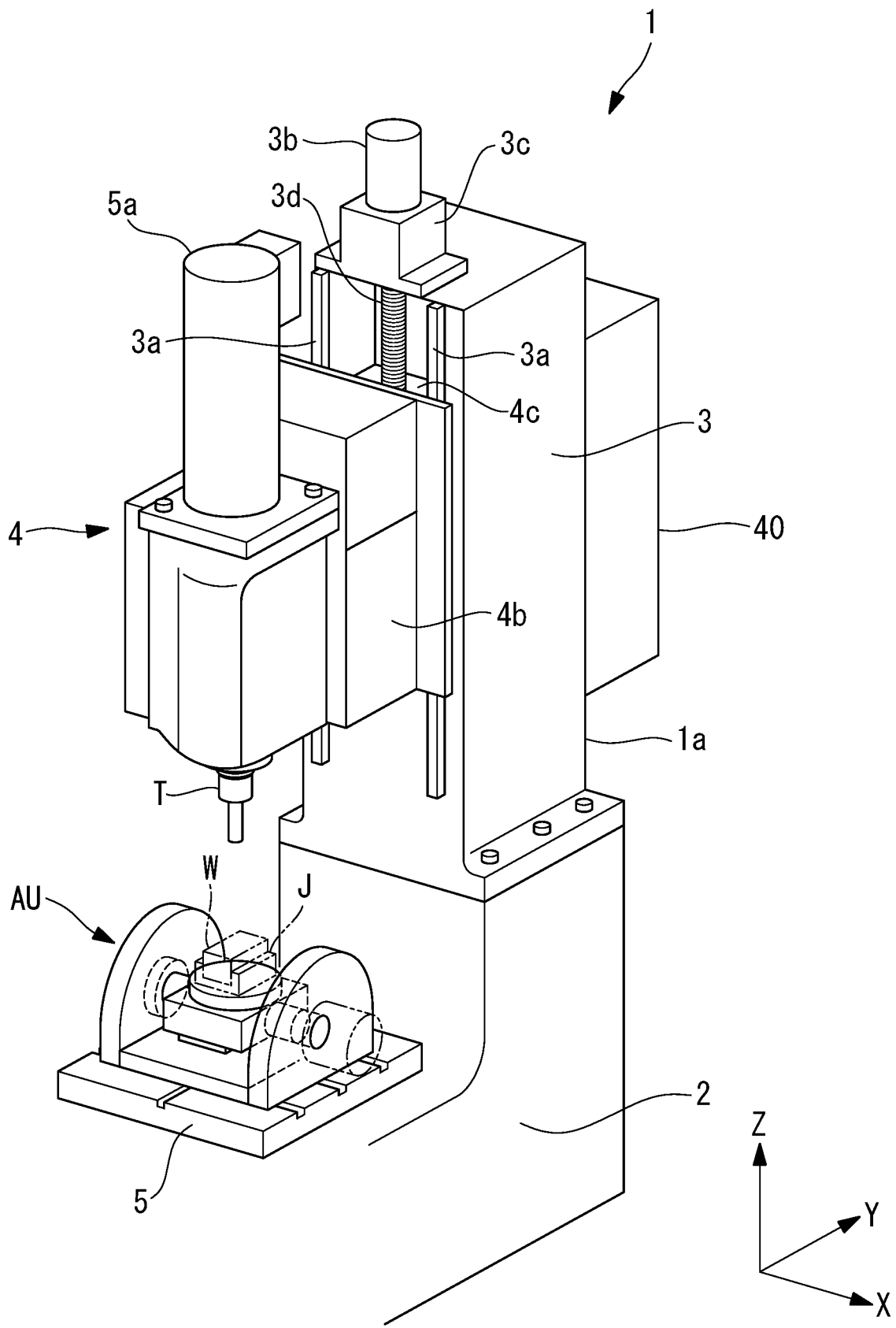
FIG. 2 is a schematic perspective view of the machine tool according to this embodiment.

Hereinafter, a machine tool 1 according to an embodiment will be described with reference to the drawings. As shown in FIG. 2, the machine tool 1 according to this embodiment includes: a machine tool main body 1a having a base 2 and a column portion 3 extending upward from the base 2; a spindle unit 4 supported on the column portion 3 so as to be movable vertically; and a table unit 5 that supports a workpiece W. As shown in FIG. 1, the machine tool 1 according to this embodiment also includes a tool magazine 7 for automatically exchanging a tool T attached to a spindle 4a of the spindle unit 4. One of a plurality of tools T contained in the tool magazine 7 is selectively held by the spindle 4a. The spindle unit 4 includes a spindle head 4b for supporting the spindle 4a. The machine tool 1 has a function of automatically exchanging the tools T between the tool magazine 7 and the spindle 4a.

The base 2 is arranged using a leveling bolt, an anchor bolt, or the like, for example, at a place where the machine tool 1 is used. The table unit 5 is positioned above the base 2, and the workpiece W is fixed via a jig J, an additional axis unit AU, or the like on an upper surface of the table unit 5. The table unit 5 and the workpiece W are moved in a horizontal direction with respect to the spindle 4a by a feed motor (not shown) provided on the base 2. The tool magazine 7 and the spindle head 4b are supported at an upper end of the column portion 3, and the tool magazine 7, the spindle 4a, and the spindle head 4b are arranged above the table unit 5.

As shown in FIG. 1, the tool T includes: a tool main body 31 and a tool holder 32 that holds the tool main body 31. The tool main body 31 is a portion that is brought into contact with the workpiece W and carries out machining to the workpiece W, and is a tool of an arbitrarily type such as a drill, a tap, or a milling, for example.

The tool holder 32 includes: a pull stud 33 held by the spindle 4a; the tapered portion 34; a flanged portion 35 held by a tool holding unit 9 of the tool magazine 7; and a collet portion 36 that holds the tool main body 31, in an order from a base end side to a tip end side. Within the collet portion 36, a collet for holding the tool main body 31 is provided, and the tool main body 31 is held by the collet portion 36 by reducing a diameter of the collet.

The flanged portion 35 of the tool T is in an approximate columnar shape having an outer diameter greater than an outer diameter of the tapered portion 34. In an outer peripheral surface of the flanged portion 35, a groove 35a that vertically engages with the tool holding unit 9 is formed.

Figure 6:
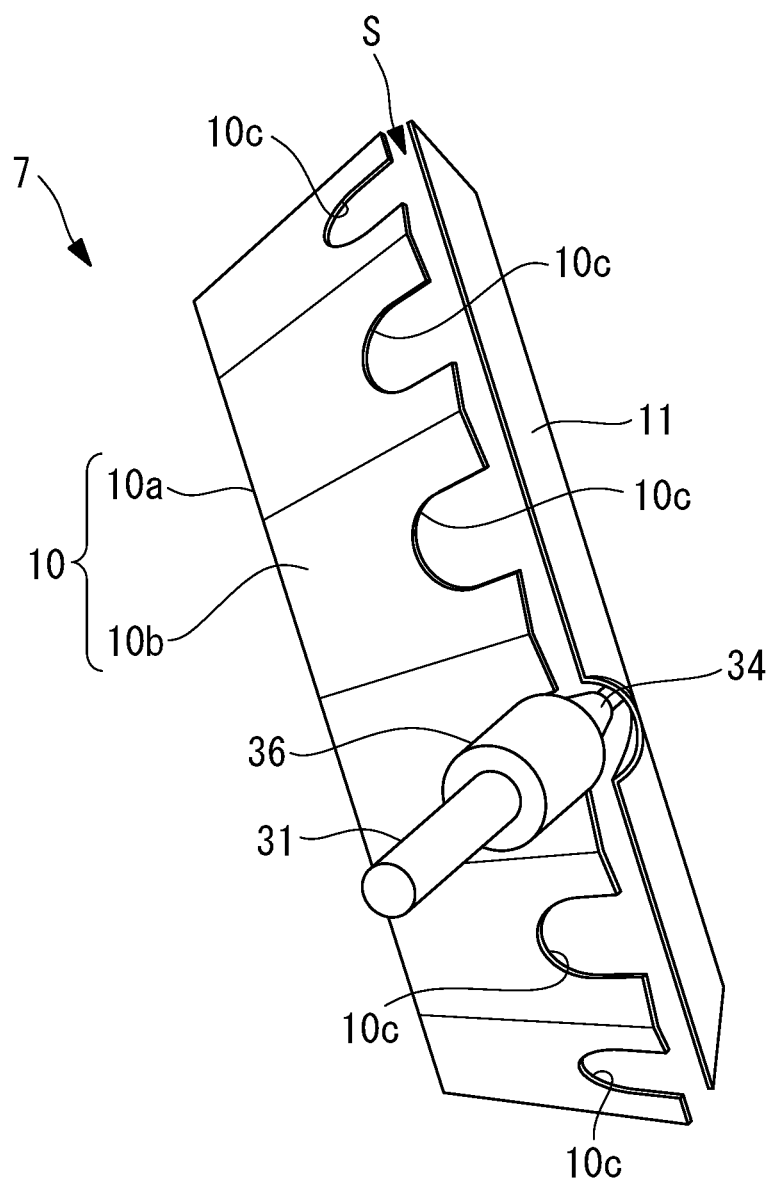
FIG. 6 is a side view of a tool holding unit and a spindle of the machine tool according to this embodiment.
Figure 7:
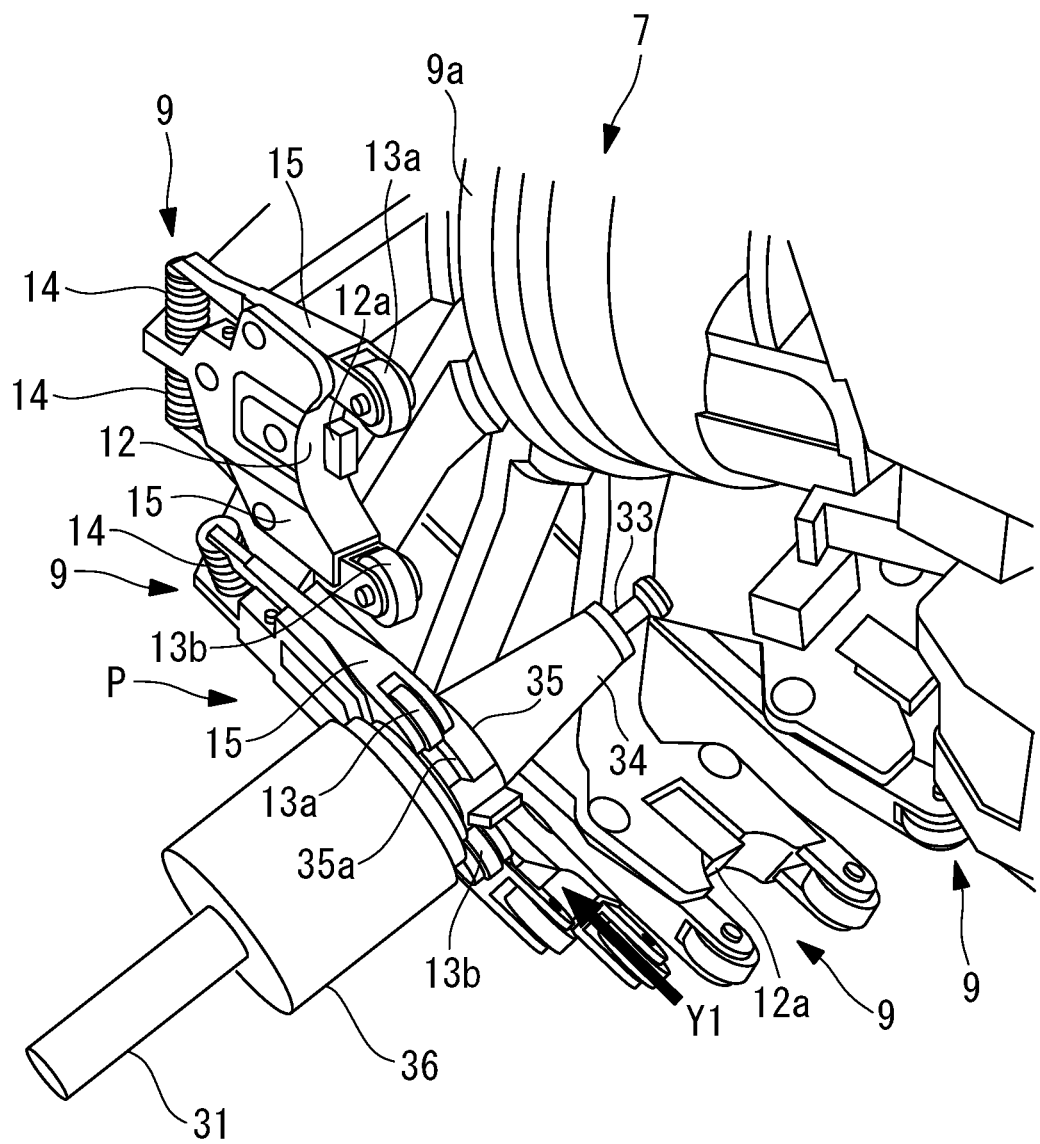
FIG. 7 is a perspective view illustrating an internal structure of a tool magazine of the machine tool according to this embodiment.

FIG. 6 shows an external appearance of the tool magazine 7, and FIG. 7 shows an internal structure of the tool magazine 7. The tool magazine 7 is in a substantially circular box shape. The tool magazine 7 includes: a plurality of tool holding units 9 which are arranged with intervals in a circumferential direction; and a front cover 10 and a back cover 11 for covering the plurality of tool holding units 9. Here, in this embodiment, a side on which the tool magazine 7 is disposed corresponds to a front side of the machine tool 1, and a side on which the column portion 3 is disposed corresponds to a back side of the machine tool 1.

As shown in FIG. 6, the front cover 10 includes: a front panel 10a having a substantially circular-plate shape, which is arranged at a front side of the tool magazine 7; and a side panel 10b having a substantially annular shape, which is arranged at a side of the tool magazine 7. The back cover 11 is a back panel having a substantially circular-plate shape, which is arranged at a back side of the tool magazine 7. Opening portions 10c are provided at positions corresponding to each of the tool holding units 9 of the side panel 10b. A space S which is formed by the covers 10, 11, is made communicate with an outside of the covers 10, 11 in a radial direction by the openings 10c, and the tools T which are held by each of the tool holding unit 9 respectively pass through the opening portions 10c.

The plurality of tool holding units 9 are supported by a holding base 9a, and the holding base 9a is supported by a supporting unit 7a provided on the back side of the tool magazine 7. For example, a hole 7b that penetrates in the horizontal direction is provided in the supporting unit 7a of the tool magazine 7, and a supporting spindle that is provided for the column portion 3 and not shown is inserted through the hole 7b. With this, the tool magazine 7 and the holding base 9a are supported by the column portion 3 in a manner swingably about an axis line extending in the horizontal direction.

Further, the holding base 9a and the front cover 10 are rotatable around a center axis line of the front cover 10, and the holding base 9a and the front cover 10 rotate by a magazine motor 9b (FIG. 8) such as a servo motor. Moreover, as shown in FIG. 1, a cut-out 11a for attaching the tool T at a tip end of the spindle 4a is provided at a lower end of the back cover 11.

Furthermore, one of the plurality of tool holding units 9 is positioned at a lowermost portion of the tool magazine 7 by the rotation of the holding base 9a. The lowermost portion corresponds to a tool changing position, and the tool changing position and the cut-out 11a are at the same position. The machine tool 1 changes the tool T held by the spindle 4a by exchanging the tools T between the tool holding unit 9 at the tool changing position and the spindle 4a. According to this embodiment, the lower end of the tool magazine 7 swings toward a back side of the machine tool 1 during the exchange. With this, the tool T held by the tool holding unit 9 is positioned immediately below the spindle 4a, or the tool holding unit 9 is engaged with the groove 35a of the flanged portion 35 of the tool T fixed to the spindle 4a.

FIG. 7 shows an example of a structure of the tool holding unit 9. The tool holding unit 9 holds the flanged portion 35 of the tool T in a state in which a tip of the tool main body 31 is directed radially outward of the tool magazine 7. To the tool holding unit 9, the tool T is attached in a predetermined attachment direction Y1 directed from the back side to the front side of the tool magazine 7 (FIG. 7).

Figure 3:
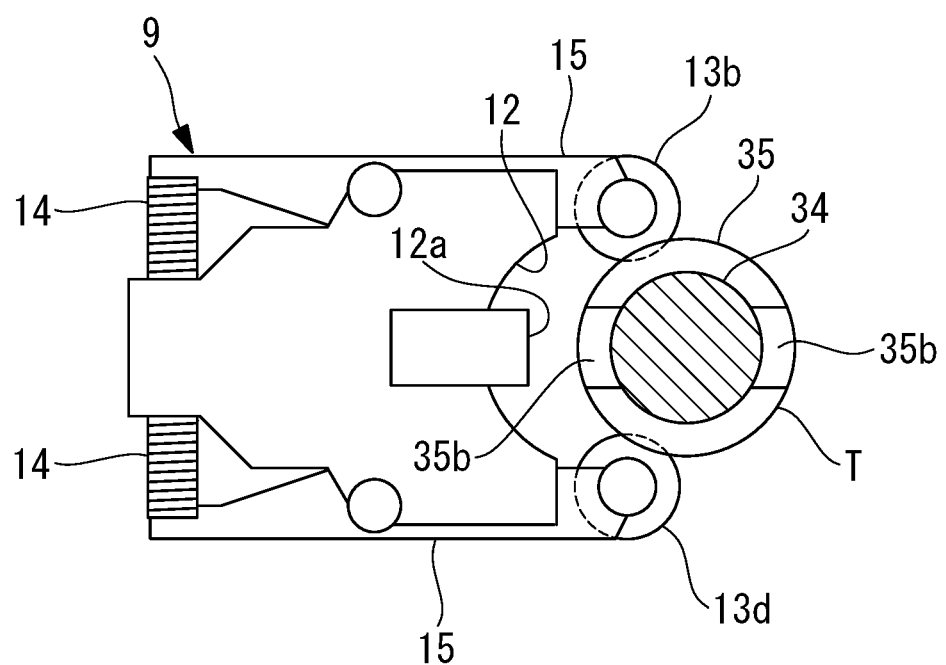
FIG. 3 is a plan view of a tool holding unit of the machine tool according to this embodiment.

Specifically, as shown in FIG. 3, FIG. 7, and the like, each of the tool holding units 9 includes: a substantially semicircular recessed portion 12 that receives the flanged portion 35 in the attachment direction Y1 and supports the front side of the flanged portion 35; and a pair of rollers 13a and 13b that support the back side of the flanged portion 35 supported by the recessed portion 12. Further, each of the tool holding units 9 includes: a pair of swingable arms 15 respectively supporting the pair of rollers 13a and 13b; and urging members 14, such as springs, that respectively urge the pair of arms 15 in a closing direction in which the pair of rollers 13a and 13b move closer to each other. The recessed portion 12 is provided with a projected portion 12a that fits in a key groove 35b defined in the flanged portion 35.

The rollers 13a and 13b are respectively supported by the arms 15 rotatably around a center axis line that is substantially parallel with a center axis line of the tool T supported by the recessed portion 12. The pair of rollers 13a and 13b are fitted into the groove 35a of the flanged portion 35 to support the flanged portion 35 by two positions in a circumferential direction. Further, the pair of rollers 13a and 13b are movable in an opening direction in which the pair of rollers 13a and 13b move away from each other against an urging force of the urging member 14.

The pair of rollers 13a and 13b are opened while being rotated by the flanged portion 35 moving in the attachment direction Y1, and with this, the flanged portion 35 is arranged in the recessed portion 12. Upon arrangement of the flanged portion 35 in the recessed portion 12, the projected portion 12a is positioned in the key groove 35b, and the pair of rollers 13a and 13b move closer to each other by the urging force of the urging member 14. Further, when the flanged portion 35 in the recessed portion 12 moves in a direction opposite of the attachment direction Y1, the pair of rollers 13a and 13b are opened while being rotated, and with this, the flanged portion 35 is removed from the tool holding unit 9.

The spindle head 4b is a tubular member extending in the vertical direction, and supported by the column portion 3 so as to be movable in the vertical direction. The spindle 4a extends in the vertical direction within the spindle head 4b, and is supported by the spindle head 4b so as to be rotatable about a center axis line of the spindle 4a.

The column portion 3 is provided with a plurality of guide rails 3a extending in the vertical direction (Z axis direction), and the spindle head 4b is supported by the guide rails 3a so as to be movable in the vertical direction. Further, a Z axis motor 3b such as a servo motor is fixed to the upper end of the column portion 3, and an output from an output shaft of the Z axis motor 3b is transmitted to a ball screw 3d via a reducer 3c. The ball screw 3d is arranged along the guide rails 3a, and threaded with a ball screw nut fixed to a back surface 4c of the spindle head 4b. With the above configuration, the spindle unit 4 moves in the vertical direction by the rotation of the output shaft of the Z axis motor 3b.

Further, the spindle 4a and the tool T rotate about the center axis line of the spindle 4a by a spindle motor (motor) 5a connected to an upper end of the spindle 4a. The machine tool 1 relatively moves the workpiece W and the tool T by horizontal movement of the table unit 5, vertical movement of the spindle 4a, and the like, and thus performs machining to the workpiece W by the rotating tool main body 31 of the tool T.

As shown in FIG. 1, the pull stud 33 and the tapered portion 34 are inserted into the spindle 4a from a lower end of the spindle 4a, and the pull stud 33 is held by a fixing mechanism FM in the spindle 4a. The fixing mechanism FM includes: a grip portion 4d that is movable vertically with respect to the spindle 4a; and an actuator 4e (FIG. 8), such as a hydraulic cylinder or an air cylinder, that moves the grip portion 4d vertically. A spring may be used, in addition to the actuator 4e. For example, upon actuation of the actuator 4e, the grip portion 4d moves upward by the spring, and with this, the pull stud 33 is pulled upward with respect to the spindle 4a. In other words, the tool T is fixed to the spindle 4a.

Figure 8:
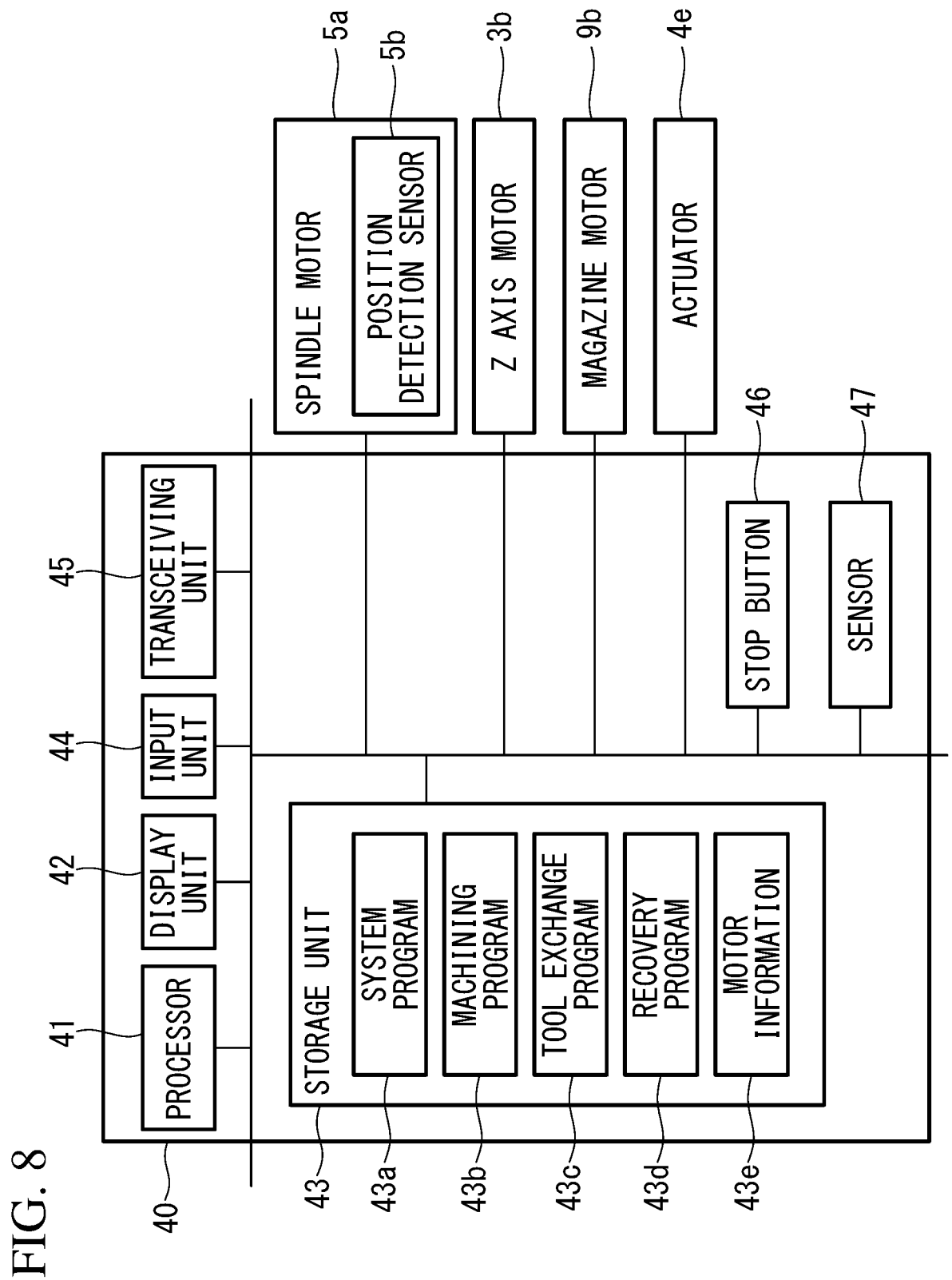
FIG. 8 is a block diagram of a controller of the machine tool according to this embodiment.

The machine tool 1 is provided with a controller 40 that controls the machine tool 1. As shown in FIG. 8, the controller 40 includes: a processor 41 such as a CPU; a display unit 42; a storage unit 43 having a nonvolatile storage, a ROM, and the like; an input unit 44 such as an operation panel; a transceiving unit 45 having an antenna, a connector, and the like; a stop button 46 such as an emergency stop button; and a sensor 47 for detecting abnormity in an operation of the machine tool 1. Examples of the sensor 47 include an ammeter for detecting abnormity in a value of a drive current of each of the motors 5a, 3b, and 9b, and a sensor for detecting abnormity in a load on the table unit 5. The storage unit 43 stores a system program 43a, which carries out a basic function of the controller 40.

Further, the storage unit 43 stores a machining program 43b and a tool exchange program 43c. The controller 40 transmits control commands to the motor, the actuator, and the like based on the machining program 43b and the tool exchange program 43c, and with this, machining by the machine tool 1, exchange of the tool T of the spindle 4a using the tool magazine 7, and the like are carried out. The storage unit 43 also stores a recovery program 43d.

A tool exchange process will be now described, in which in a state where a tool T is attached to the spindle 4a, and the tool T is changed by selected one of the plurality of tools T of the tool magazine 7. Here, at the lower end of the spindle 4a, a pair of projected portions 4f in which a pair of key grooves 35b provided in the flanged portion 35 of the tool T are respectively fitted are provided.

First, the controller 40 fixes the spindle 4a in a state in which the key grooves 35b of the tool T facing a predetermined direction (Step A). The fixing of the spindle 4a is carried out by supplying direct current to each pole of the spindle motor 5a as a multipolar motor. Subsequently, the controller 40 moves the spindle 4a upward and arranges at a first position (Step B). At this time, the lower end of the tool magazine 7 swings to the back side of the machine tool 1, and as shown in FIG. 1 and FIG. 3, by this swinging, the tool holding unit 9 at a position of the tool magazine 7 corresponding to the cut-out 11a starts to engage with the groove 35a of the flanged portion 35 of the tool T of the spindle 4a.

In this embodiment, a part of the back side of the tool magazine 7 is in contact with a front contact portion of the spindle unit 4, and the contact position changes according to upward movement of the spindle unit 4. Therefore, the lower end of the tool magazine 7 swings according to vertical movement of the spindle unit 4, by own weight of the tool magazine 7 or a spring that is not shown. Here, the tool magazine 7 may be caused to swing by a motor, a cylinder, a link mechanism, or the like.

Figure 4:
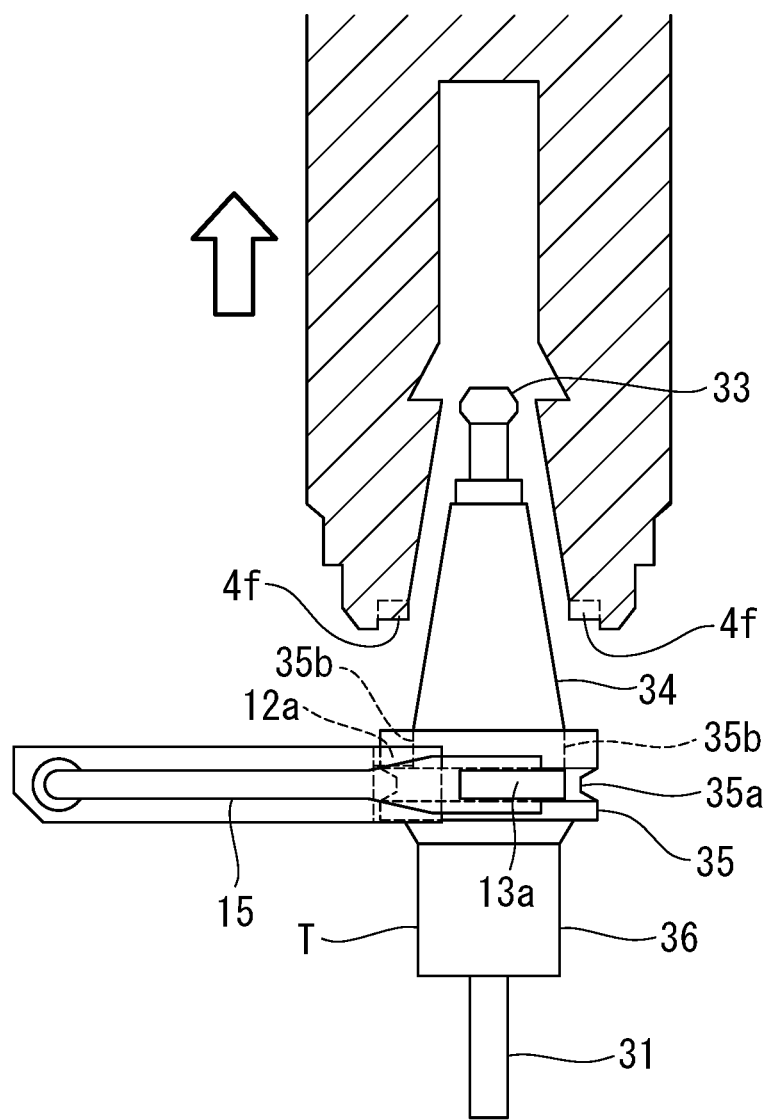
FIG. 4 is a side view of a tool holding unit and a spindle of the machine tool according to this embodiment.
Figure 5:
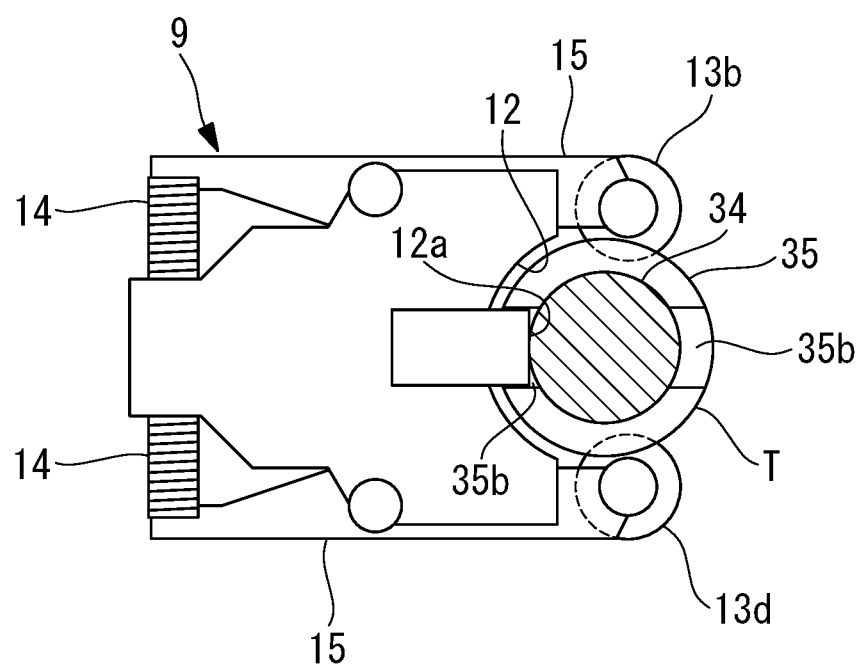
FIG. 5 is a plan view of the tool holding unit of the machine tool according to this embodiment.

Next, the controller 40 moves the spindle 4a to a second position that is higher than the first position (Step C). While the spindle 4a moves to the second position, the lower end of the tool magazine 7 further moves to the back side of the machine tool 1, and with this, the tool T is fully held by the tool holding unit 9. Further, fixing of the tool T by the fixing mechanism FM is released at the second position. With this, the tool T removed from the spindle 4a is held by the tool holding unit 9 (FIG. 5). Moreover, the projected portion 12a of the tool holding unit 9 is fitted into the key groove 35b of the tool T. Then, as shown in FIG. 4, the controller 40 moves the spindle 4a to a third position that is higher than the second position. At this time, the projected portion 4f of the spindle 4a and the key groove 35b are disengaged at a fourth position between the second position and the third position.

Next, the controller 40 controls the magazine motor 9b to arrange the selected tool T of the tool magazine 7 at a position corresponding to the cut-out 11a (Step D). Then, the controller 40 moves the spindle 4a down to the second position (Step E). At this time, the controller 40 controls the actuator 4e of the fixing mechanism FM to fix the selected tool T to the spindle 4a.

Subsequently, the controller 40 moves the spindle 4a to a position that is lower than the first position (Step F). In this step, the lower end of the tool magazine 7 gradually moves toward the front of the machine tool 1, and the selected tool T is detached from the tool holding unit 9. Then, the controller 40 carries out machining using the tool T fixed to the spindle 4a. It should be noted that in Steps C and E, the tool holding unit 9 may move to the back side of the machine tool 1 with respect to the holding base 9a in order to establish a holding state in which the tool holding unit 9 holds the tool T or a non-holding state.

Figure 9:
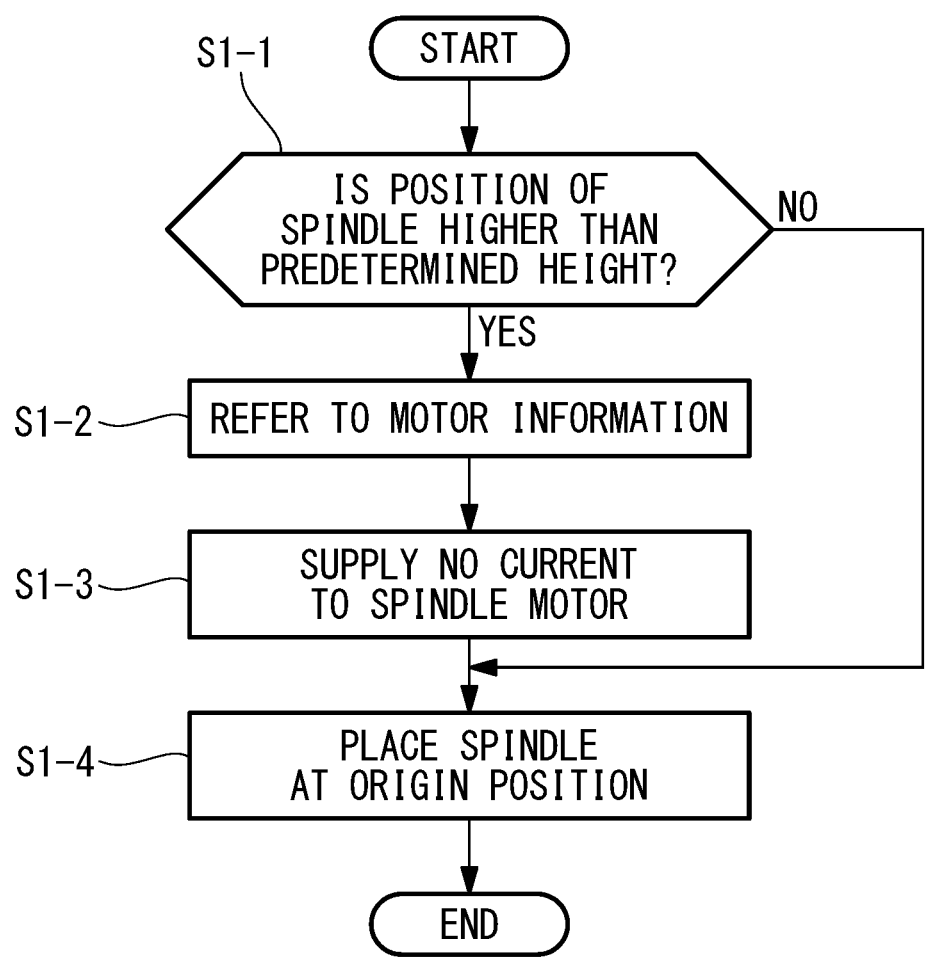
FIG. 9 is a flowchart of an example of a process by the controller of the machine tool according to this embodiment.

During Steps A to F described above, there is a case in which the machine tool 1 stops due to operation of the stop button 46 or the like. There is also a case in which when the value of the drive current of each of the motors 5a, 3b, and 9b is greater than a threshold value, the controller 40 stops the machine tool 1. Further, there is a case in which when a value detected by the sensor 47 is greater than the threshold value, the controller 40 stops the machine tool 1. There is a case in which the machine tool 1 stops due to electric power outage. With these, current supply to the spindle motor 5a also stops. By a user commanding a recovery process after the machine tool 1 stops during Steps A to F in this manner, the controller 40 carries out a recovery process based on the recovery program 43d. The recovery process will be described with reference to a flowchart of FIG. 9.

First, the controller 40 determines whether the spindle 4a is at a position higher than a predetermined height or not (Step S1-1). One example of the predetermined height is a position slightly lower than the first height and that indicates that exchange of tools has started. The predetermined height may be the first position or a position near the first position.

If it is determined to be "YES" in Step S1-1, the controller 40 refers to motor information 43e of the spindle motor 5a stored in the storage unit 43 (Step S1-2). The motor information 43e at least includes information indicating whether the spindle motor 5a is a synchronous motor or not.

If the spindle motor 5a is a synchronous motor, the controller 40 uses a command for the synchronous motor as a part of the recovery process. As one example of the command, the controller 40 maintains a state in which direct current is not supplied to each pole of the spindle motor 5a (Step S1-3). In other words, similarly to Step A to F described above, exchanging of the tools T is normally carried out in a state in which direct current is supplied to each pole of the spindle motor 5a and the spindle 4a is fixed. However, in the recovery process for the synchronous motor, direct current is not supplied to each pole of the spindle motor 5a.

Further, the controller 40 transmits a control command to the Z axis motor 3b as a command for the synchronous motor, and with this, the spindle 4a is arranged at an origin position (Step S1-4). The origin position is, for example, a position lower than the predetermined height. For example, if the machine tool 1 stops during Steps C to E, the spindle 4a moves to the origin position passing the second position. During the movement, the controller 40 transmits a control command to the actuator 4e, and fixes the tool T at a position corresponding to the cut-out 11a of the tool magazine 7 to the spindle 4a.

If the machine tool 1 stops in Steps A, B, and F, the controller 40 simply moves the spindle 4a to the origin position. On the other hand, if it is determined to be "NO" in Step S1-1, the controller 40 moves the spindle 4a to the origin position (S1-4).

Figure 10:
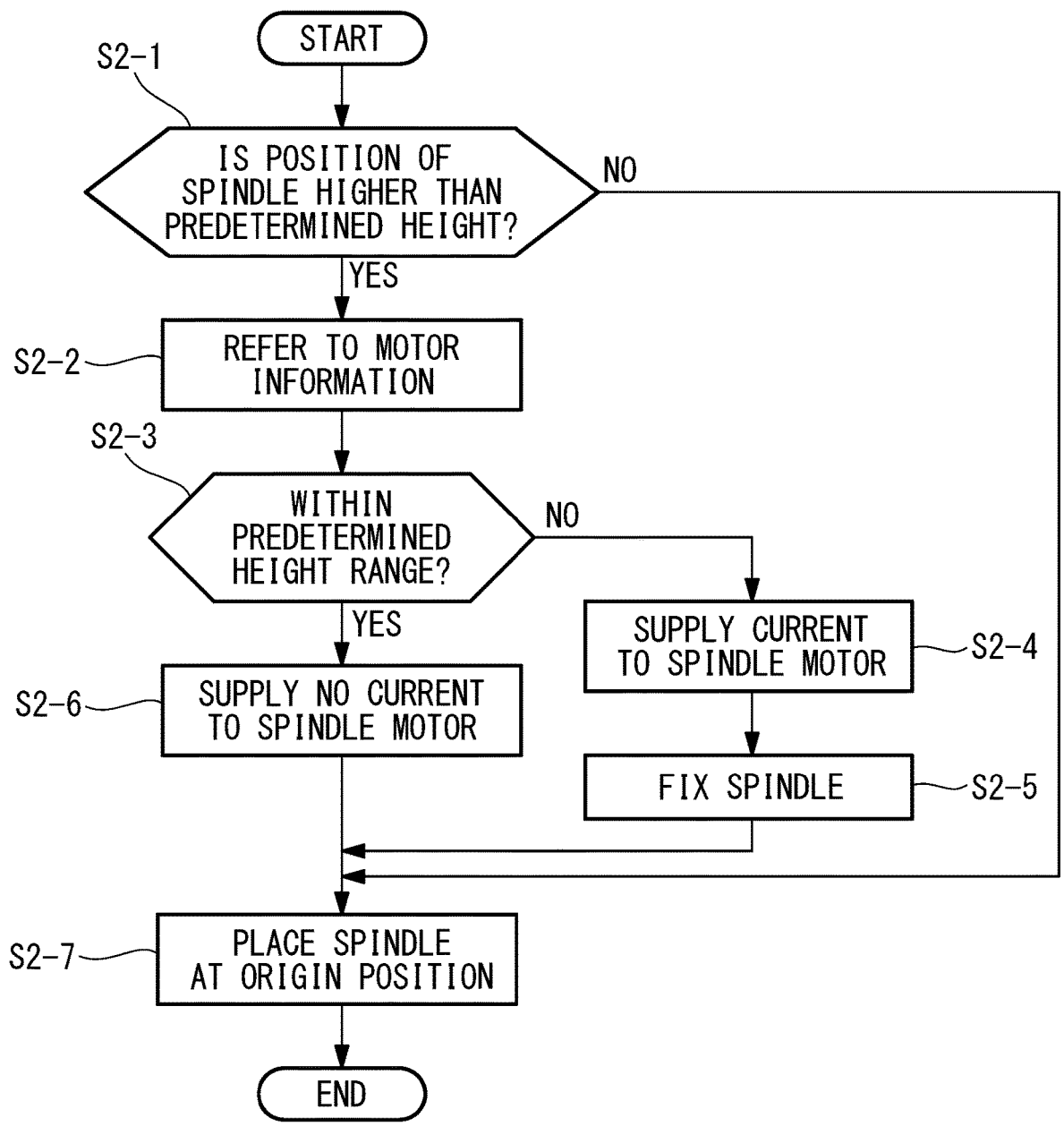
FIG. 10 is a flowchart of an example of a process by the controller of the machine tool according to this embodiment.

Here, when the spindle motor 5a is a synchronous motor, the controller 40 may change the recovery process according to a height of the spindle 4a when stopped. A process by the controller 40 based on the recovery program 43d at this time will be described with reference to a flowchart of FIG. 10.

First, the controller 40 determines whether or not the spindle 4a is at a position higher than the predetermined height (Step S2-1), and refers to the motor information 43e as in Step S1-2 (Step S2-2). Further, the controller 40 determines whether or not the spindle 4a is positioned within a predetermined height range (Step S2-3). The determination is made based on a value detected by a position detection sensor 3e such as an encoder incorporated in the Z axis motor 3b. The position detection sensor 3e may be a distance sensor that directly detects a vertical position of the spindle 4a. The position detection sensor 3e is connected to the controller 40.

In one example, in the predetermined height range, the key groove 35b of the tool T is engaged with the projected portion 12a of the tool holding unit 9, and the tool T is fixed to the spindle 4a. More safely, in the predetermined height range, the tool holding unit 9 is in contact with the tool T, and the tool T is fixed to the spindle 4a. A more specific example of the predetermined height range is a range between the first position and the fourth position.

Subsequently, if it is determined to be "YES" in Step S2-1, if it is recognized that the spindle motor 5a is a synchronous motor in Step S2-2, and if it is determined to be "NO" in Step S2-3, the controller 40 supplies current to the spindle motor 5a (Step S2-4). With this, the controller 40 slightly rotates the spindle motor 5a, thereby grasps a rotating position of a rotor 5c of the spindle motor 5a.

Then, the controller 40 fixes the spindle 4a in the state in which the key grooves 35b of the tool T facing the predetermined direction, as in Step A (Step S2-5). Next, similarly to Step S1-4, the controller 40 arranges the spindle 4a at the origin position (Step S2-7).

On the other hand, if it is determined to be "YES" in Step S2-1, if it is recognized that the spindle motor 5a is a synchronous motor in Step S2-2, and if it is determined to be "YES" in Step S2-3, while the controller 40 maintains the state in which direct current is not supplied to each pole of the spindle motor 5a, as in Step S1-3 (Step S2-6), the controller 40 arranges the spindle 4a at the origin position as in Step S1-4 (Step S2-7). On the other hand, if it is determined to be "NO" in Step S2-1, the controller 40 moves the spindle 4a to the origin position (S2-7).

Here, before Step S1-3 and Step S2-6, determination on whether or not the controller 40 knows the rotating position of the rotor 5c of the spindle motor 5a may be made. For example, in a case in which the spindle motor 5a is provided with a rotational position detection sensor 5b such as an encoder, the controller 40 is able to recognize the rotating position of the rotor 5c of the spindle motor 5a after the stopping. When the controller 40 recognizes the rotating position of the rotor 5c of the spindle motor 5a, the controller 40 fixes the spindle 4a in the state in which the key grooves 35b of the tool T facing the predetermined direction, instead of Step S1-3 and Step S2-6. On the other hand, when the controller 40 does not recognize the rotating position of the rotor 5c of the spindle motor 5a, the controller 40 carries out Step S1-3 and Step S2-6.

Here, there is a possibility that an induction motor as the spindle motor 5a is attached to the machine tool 1. There is also a case in which a purchaser or a user of the machine tool 1 is able to select the spindle motor 5a from a plurality of types of induction motors and a plurality of types of synchronous motors. Information suitable for the selected motor is used as the motor information 43e stored in the storage unit 43.

When an induction motor is attached to the machine tool 1, it is recognized that the spindle motor 5a is not a synchronous motor in Step S1-2 and Step S2-2, and a command for synchronous motor is not used. In other words, the processes after Step S1-3 and after Step S2-3 are not carried out, and the spindle 4a is moved to the origin position after excitation of a stator 5d for fixing the rotor 5c of the spindle motor 5a is carried out.

An induction motor is able to fix the rotor 5c at a position at that time by excitation of the stator 5d, even when the rotating position of the rotor 5c is unknown. On the other hand, in the case of a synchronous motor, the rotor 5c may accidentally rotate if the stator 5d is excited in the state in which the rotating position of the rotor 5c is unknown.

In the above embodiment, when the machine tool 1 stops, and when the motor information 43e indicates that the spindle motor 5a is a synchronous motor, the controller 40 uses a command for synchronous motor as a part of a series of commands for recovery. When the spindle motor 5a is a synchronous motor, if the stator 5d of the spindle motor 5a is excited in the state in which the rotating position of the rotor 5c of the spindle motor 5a is unknown, the rotor 5c may accidentally rotate. For example, in a state in which the tool T is held by the tool holding unit 9, and the key grooves 35b of the tool T are engaged with the projected portions 4f of the spindle 4a, the above situation may cause damages to structures of the machine tool 1, the tool T, and the like. The configuration of the above embodiment contributes to the prevention of such damages due to the accidental rotation of the rotor 5c.

Further, according to the above embodiment, when the machine tool 1 stops, when the motor information 43e indicates that the spindle motor 5a is a synchronous motor, and when the controller 40 does not recognize the rotating position of the rotor 5c of the spindle motor 5a, the controller 40 uses a command for synchronous motor as a part of a series of commands for recovery. With this configuration, it is also possible to prevent damages to structures of the machine tool 1, the tool T, and the like due to the accidental rotation of the rotor 5c from occurring. Further, according to the above configuration, even when the spindle motor 5a is a synchronous motor, the spindle 4a is fixed in the recovery process similarly to the case of an induction motor, as long as the controller 40 recognizes the rotating position of the rotor 5c of the spindle motor 5a.

It should be noted that there is a case in which the selected one of the plurality of tools T held by the tool magazine is attached to and detached from the spindle 4a using other known mechanisms. In this case, too, as described above, using a command for synchronous motor, attachment of the tool T to the spindle 4a and movement of the spindle 4a to the origin position are carried out using the actuator 4e, in the state in which excitation of the stator 5d for fixing the rotor 5c of the spindle motor 5a is not carried out.

The invention claimed is:

1. A machine tool, comprising:
a spindle;
a motor configured to rotate the spindle;
a tool magazine holding a plurality of tools; and
a controller, wherein
the controller has a storage unit that stores motor information indicating that the motor is a synchronous motor, and
when the machine tool stops while a tool exchange process is being carried out in response to one of an input from a stop button, an instruction from the controller as a result of at least one of a drive current exceeding a threshold value and a force exceeding a threshold value, or an electric power outage, wherein the force is detected by a force sensor provided in the machine tool, the controller is configured to use a command for the synchronous motor as a part of a series of commands for moving the spindle to an origin position in order to recover the machine tool during a tool exchange process, the controller is configured to decide to use the command based on the motor information, the tool exchange process being a process in which a tool attached to the spindle is replaced with one of the plurality of tools of the tool magazine.

2. The machine tool according to claim 1, wherein the command for the synchronous motor is a command for not carrying out excitation of a stator for fixing the rotor of the motor when attachment of one of the plurality of tools to the spindle is carried out.

3. A machine tool comprising:
a spindle;
a motor configured to rotate the spindle;
a tool magazine holding a plurality of tools; and
a controller, wherein
the controller has a storage unit that stores motor information indicating that the motor is a synchronous motor, and
when the machine tool stops while a tool exchange process is being carried out in response to one of an input from a stop button, an instruction from the controller as a result of at least one of a drive current exceeding a threshold value and a force exceeding a threshold value, or an electric power outage, wherein the force is detected by a force sensor provided in the machine tool, the controller is configured to use a command for the synchronous motor as a part of a series of commands for moving the spindle to an origin position in order to recover the machine tool during a tool exchange process, the controller is configured to decide to use the command based on the motor information and on a situation in which a rotating position of a rotor of the motor is unrecognized, the tool exchange process being a process in which a tool attached to the spindle is replaced with one of the plurality of tools of the tool magazine.

4. A machine tool, comprising:
a spindle;
a motor configured to rotate the spindle;
a tool magazine holding a plurality of tools; and
a controller, wherein
the controller has a storage unit that stores motor information indicating that the motor is a synchronous motor, and
when the machine tool stops while a tool exchange process is being carried out in response to one of an input from a stop button or an electric power outage, the controller is configured to use a command for the synchronous motor as a part of a series of commands for moving the spindle to an origin position in order to recover the machine tool during a tool exchange process, the controller is configured to decide to use the command based on the motor information, the tool exchange process being a process in which a tool attached to the spindle is replaced with one of the plurality of tools of the tool magazine.

* * * * *